Figure 1:
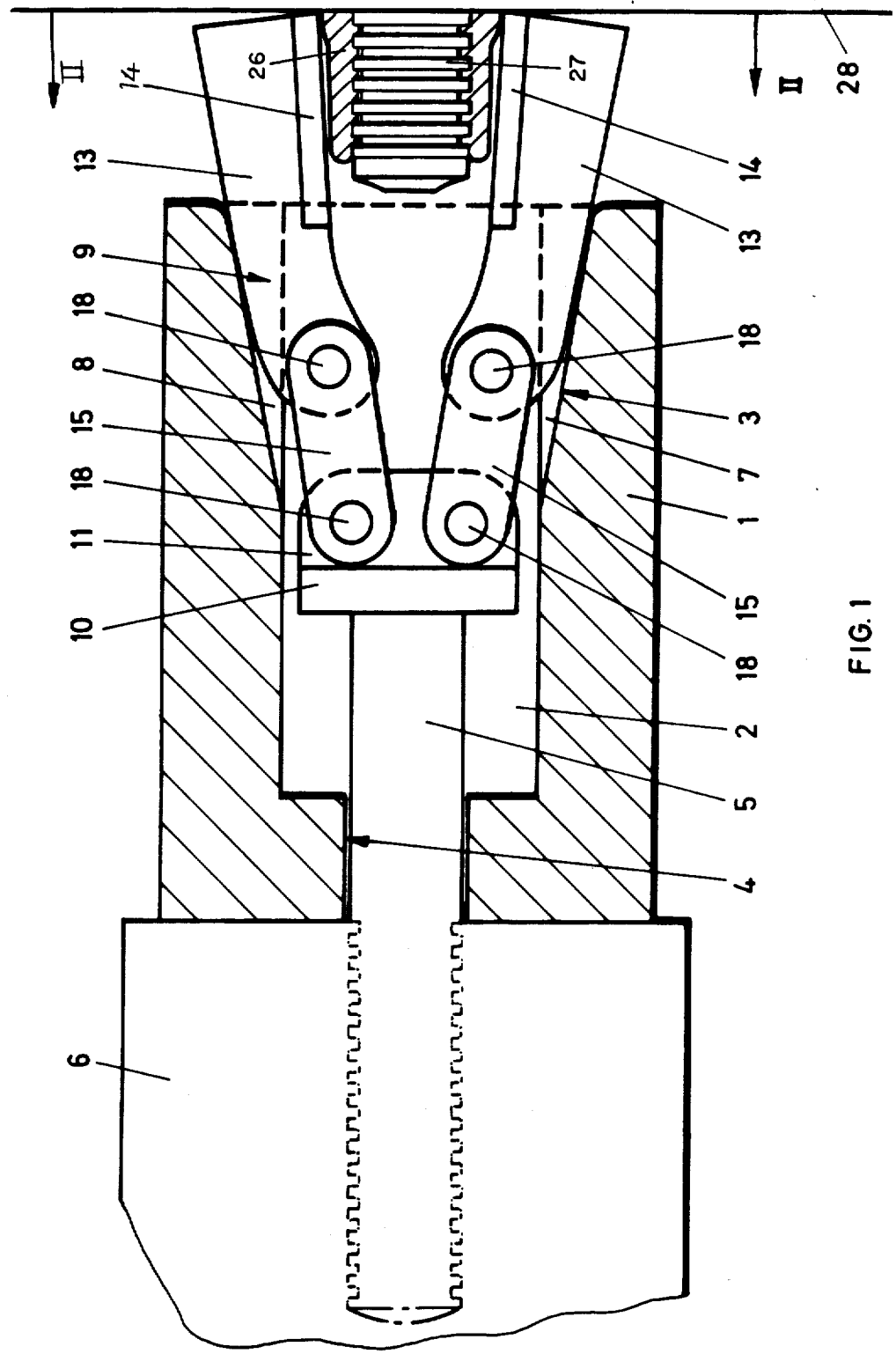

United States Patent [19]

Lockey

[11] Patent Number: 4,704,793
[45] Date of Patent: Nov. 10, 1987

[54] COLLAR SPLITTERS FOR LOCK BOLT FASTENING SYSTEMS

[75] Inventor: Joseph Lockey, Newcastle Under Lyme, England

[73] Assignee: Coal Industry (Patents) Limited, London, England

[21] Appl. No.: 776,516

[22] Filed: Sep. 16, 1985

[51] Int. Cl.$^4$ ............................................. B26B 7/00
[52] U.S. Cl. ................................... 30/187; 30/272 R
[58] Field of Search ............... 30/187, 245, 248, 287, 30/272; 81/113; 72/450, 451, 452

[56] References Cited

U.S. PATENT DOCUMENTS

| 770,270 | 9/1904 | Dehn | 30/187 X |
|---|---|---|---|
| 1,023,709 | 4/1912 | Baker | 30/246 |
| 1,764,911 | 6/1930 | Trent | 30/187 |
| 3,893,237 | 7/1975 | Jahnke | 30/187 X |

FOREIGN PATENT DOCUMENTS 739033 10/1955 United Kingdom .
1107800 3/1968 United Kingdom .

*Primary Examiner*—E. R. Kazenske
*Assistant Examiner*—William Fridie, Jr.
*Attorney, Agent, or Firm*—James C. Wray

[57] ABSTRACT

A collar splitter for a lock bolt fastening system comprising a body having a partly tapered passage, a draw rod component slidable within the passage, and a cutter blade arrangement pivotally mounted on the draw rod component. A toggle link arrangement ensures that when the collar splitter is activated to split the relatively soft locking collar the cutter blades do not contact the relatively hard lock bolt.

5 Claims, 2 Drawing Figures

COLLAR SPLITTERS FOR LOCK BOLT FASTENING SYSTEMS

This invention relates to improvements in collar splitters for lock bolt fastening systems, the fastening systems comprising a lock bolt having a head and a shaft provided with a number of annular grooves in place of the conventional screw thread. Instead of a conventional nut having a screw thread a locking collar is provided which, in use, is slid along the lock bolt shaft into a tightly retaining position and is then crushed on to the annular grooves to rigidly secure the lock bolt fastening system. When it is desired to disconnect the fastening system it is necessary to split the locking collar which thereby is released from the bolt.

Various methods have been used to remove the locking collar including manually held chisels and power activated chisels including a pair of opposed cutting blades for engaging the collar. Unfortunately, in many installations using lock bolt fastening systems the prior available power activated chisels are prevented from locating on the nuts because of adjacent items of equipment mounted in the vicinity of the nuts. Previously, in such installations it has been necessary to turn to the time consuming and arduous tasks of using manually held chisels and hammers to release the collar.

An object of the present invention is to provide an improved collar splitter for lock bolt fastening systems which tends to overcome or reduce the above mentioned problem.

According to the present invention a collar splitter for disconnecting a lock bolt fastening system having a lock bolt and locking collar comprises a body defining passage means, a rod component slidable within the passage means, and a cutter blade arrangement pivotally mounted on the rod component, the body and the rod component being adapted for engagement by a powered tool such that in use when the tool is activated the rod component together with at least a portion of the cutter blade arrangement slide relative to the passage means, the cutter tool arrangement co-operating with the passage means such that in use when the cutter blade arrangement is engaged on the locking collar and the tool is activated, the cutter blade arrangement is urged to close to split the locking collar to disconnect the lock bolt fastening system.

Preferably, at least a portion of the passage means is tapered.

Advantageously, the cutter blade arrangement comprises a plurality of cutter blade components pivotally mounted on the rod component.

Preferably, each cutter blade component comprises a cutter blade and a toggle link pivotally connecting the associated blade to the rod component.

Conveniently, the rod component is a draw rod for urging the cutter blade arrangement further into the tapered passage means.

Preferably, the body defines groove means for guidably receiving portions of the cutter blade arrangement.

Figure 2:
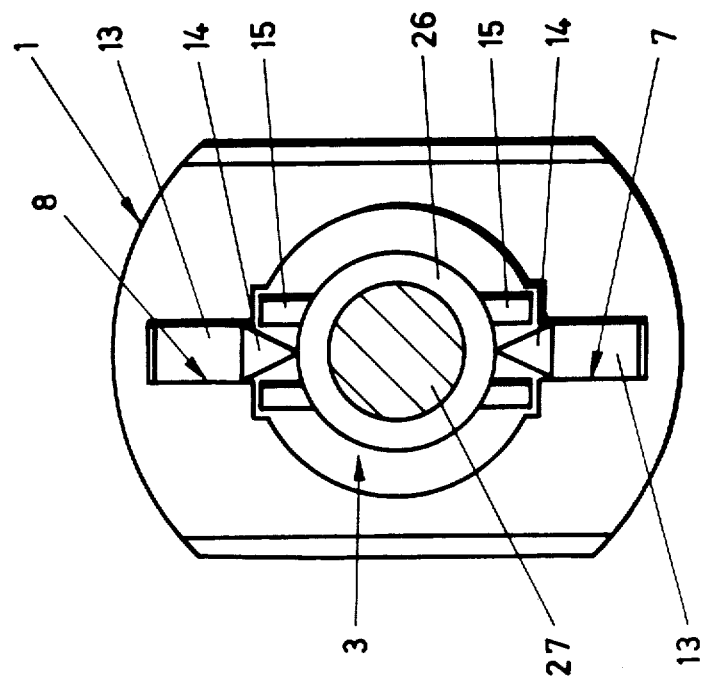

By way of example, one embodiment of the present invention will be described with reference to the accompanying drawings, in which:

FIG. 1 is a side elevation, partly in section, of a collar splitter constructed according to the present invention and shown in an operational position; and FIG. 2 is an incomplete cross sectional view taken along line II—II of FIG. 1.

In the drawings the locking collar splitter is shown mounted on a hydraulically actuated powered tool 6 and engaging a locking collar 26 fixedly mounted on a lock bolt 27 of a lock bolt fastening system fixedly securing equipment 28.

The drawings show the locking collar splitter to comprise a hollow body 1 defining a through stepped passage 2 a portion 3 of which, as seen in FIG. 1 is tapered outwardly towards one end. The end 4 of the passage opposite to said one end substantially is parallel and defines a slideway for a draw rod component 5 as will be explained later in the specification. The end of the body adjacent to the parallel portion 4 of the passage 2 is provided with means (not shown) for fixedly attaching the body to a nose portion of the hydraulically powered tool 6. The outwardly tapered portion 3 of the passage 2 is provided with two opposed grooves 7 and 8 for guidably supporting portions of a cutter blade arrangement 9.

The aforementioned draw rod component 5 is slidably mounted within the passage 2 and is slidably supported by the parallel portion 4 of the passage. The draw rod component 5 comprises adaptor means for drivable engagement by a working portion of the tool which when the tool is activated draws the draw rod component 5 further into the tool body relatively to the nose portion. Thus when the tool is activated the draw rod component is effectively slid along the passage 2 in a direction towards the tool 6. The working portion of the tool is not shown in the drawings.

The end of the pull rod component 5 remote from the tool 6 is provided with an enlarged head 10 having an outwardly directed flange 11 on to which is pivotally mounted the aforementioned cutter blade arrangement 9, the arrangement comprising two opposed cutter blade components each pivotally connected to the flange 11 of the draw rod component head 10. Each cutter blade component comprises a cutter blade 13 having a radially inwardly directed cutting edge 14 and a toggle link arrangement 15 pivotally engaged on opposite sides of the flange 11 and of the associated blade 13. Pivot pins 18 pivotally retain the toggle link arrangements to the flange and blades. The provision of the toggle link arrangement enables that during cutting the associated cutting edge 14 of each blade 13 to be maintained substantially parallel to the passage's longitudinal axis thereby enabling a substantially uniform cutting action to be maintained across the full width of the locking collar 26. This is important, as in use, such a construction enables the blades to cut through the relatively soft collar sufficiently to split the collar before any part of the blades contacts the relatively hard lock bolt 27. Thus, damage to the blades is avoided and wear of the cutting edge reduced to a minimum.

In use, the cutter blades of the cutter blade arrangement are located on opposite sides of the locking collar 26 to be split (as shown in the drawings). The relatively long body enabling the collar splitter to be threaded past any adjacent items of equipment. The hydraulically powered tool 6 then is activated to draw the draw rod component towards the tool thereby drawing the cutter blade arrangement along the passage 2 further into the body 1. The effect of this sliding movement is to urge the cutter blades along the guide grooves and further into the tapered portion of the passage thereby urging the cutting edges to close and cut through the locking collar 26. Upon sufficient closing of the cutter blades the relatively soft collar splits to release the collar from the lock bolt to disconnect the lock bolt fastening system.

It will be appreciated that the present invention provides a simple, effective and reliable locking collar splitter which is able to engage locking collars, installed in the vicinity of other items of equipment. The side of the body are cut away to assist collar engagement in restricted zones and the leading edges of the body are chamfered to assist in locating the collar.

In modified embodiments the two cutter blades are not diametrically opposed but arranged to cut along a chord across the locking collar.

In other embodiments more than two cutter blades are provided.

In still other embodiments only one cutter blade is urged towards a closed position, the other blade remaining stationary.

I claim:

1. A collar splitter for disconnecting a lock bolt fastening system having a lock bolt and locking collar, comprising a body defining a central passage and a central opening at one end of the body, wherein the central opening has outwardly sloped sidewalls, a rod component slidable within the passage, and a cutter blade arrangement pivotally mounted on the rod component for pivotal movement, the body and the rod component being adapted for engagement by a powered tool such that in use when the tool is activated the rod component together with a portion of the cutter blade arrangement slide relative to and within the passage, and the blade arrangement co-operating with the sloped sidewalls of the central opening such that in use when the cutter blade arrangement is engaged on the locking collar and the tool is activated, inward axial movement of the rod component imparts radially inwardly and parallel cutting movement of the cutter blade arrangement evenly to split the locking collar to disconnect the lock bolt fastening system.

2. A collar splitter as claimed in claim 1, which the cutter blade arrangement comprises a plurality of cutter blade components pivotally mounted on the rod component.

3. A collar splitter as claimed in claim 2, in which each cutter blade component comprises a cutter blade and a toggle link pivotally connecting the associated blade to the rod component.

4. A collar splitter as claimed in claim 3, in which the rod component is a draw rod for urging the cutter blade arrangement further into the central opening.

5. A collar splitter as claimed in claim 1, in which the body defines groove means for guidably receiving portions of the cutter blade arrangement.

* * * * *

UNITED STATES PATENT OFFICE
CERTIFICATE OF CORRECTION

Patent No. 4,704,793　　　　　　　　　Dated November 10, 1987

Inventor(s) Joseph Lockey

It is certified that error appears in the above-identified patent and that said Letters Patent are hereby corrected as shown below:

Column 4, line 12, after "claim 1," insert --in--.

Signed and Sealed this

Fifth Day of July, 1988

*Attest:*

DONALD J. QUIGG

*Attesting Officer*　　　*Commissioner of Patents and Trademarks*